No. 649,325. Patented May 8, 1900.
C. W. LOOMIS.
VEHICLE BRAKE.
(Application filed Jan. 18, 1899.)
(No Model.) 2 Sheets—Sheet 1.
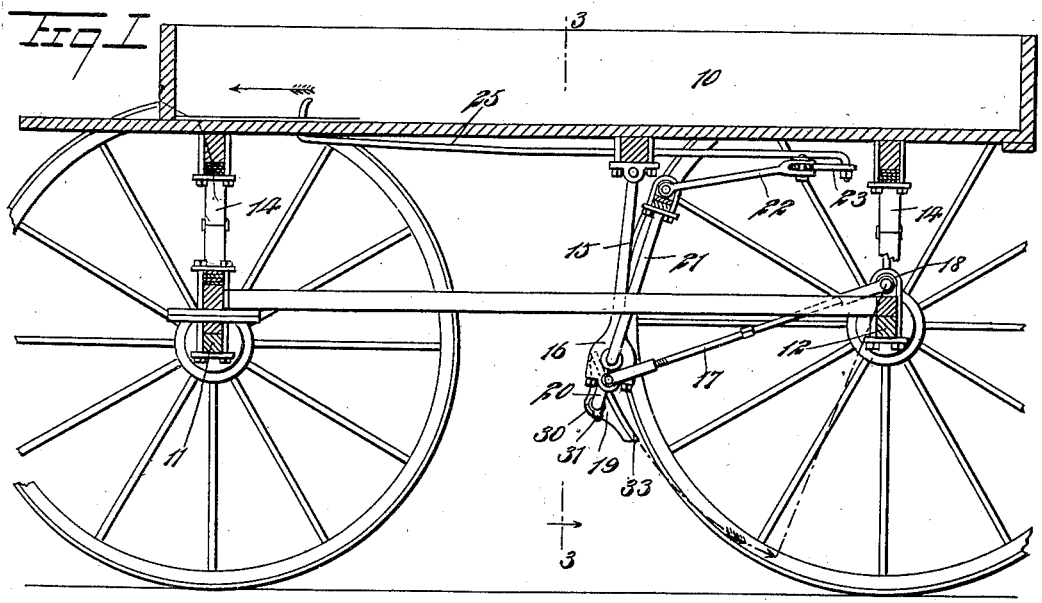
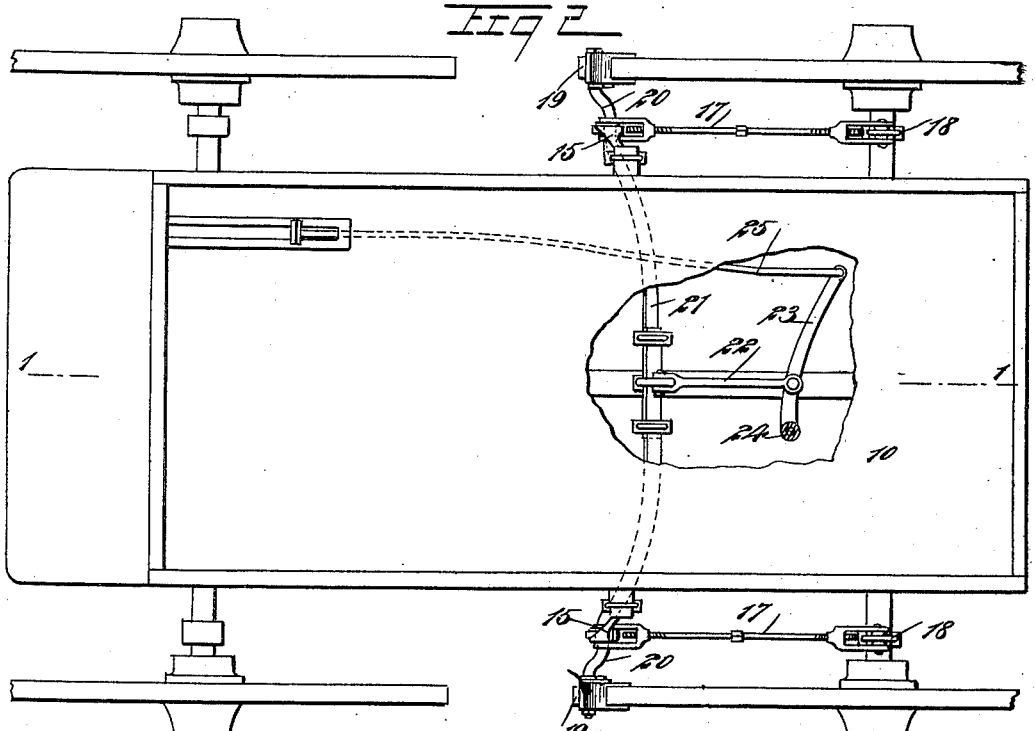
WITNESSES:
H. Walker
Isaac B. Owens.
INVENTOR
Charles W. Loomis.
BY
ATTORNEYS.

No. 649,325. Patented May 8, 1900.
C. W. LOOMIS.
VEHICLE BRAKE.
(Application filed Jan. 18, 1899.)
(No Model.) 2 Sheets—Sheet 2.
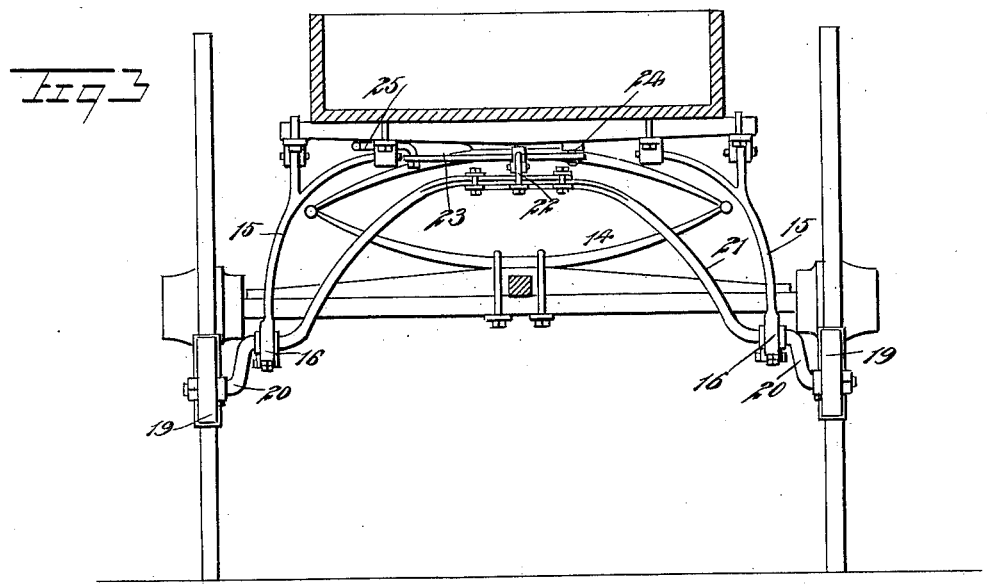
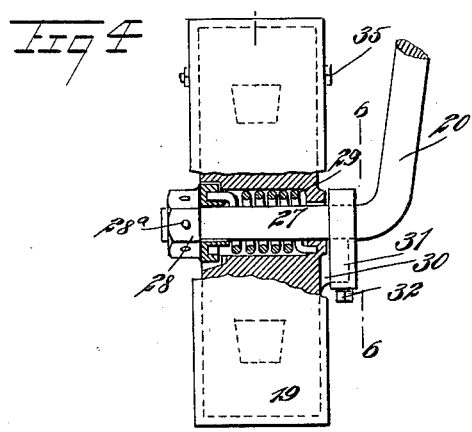
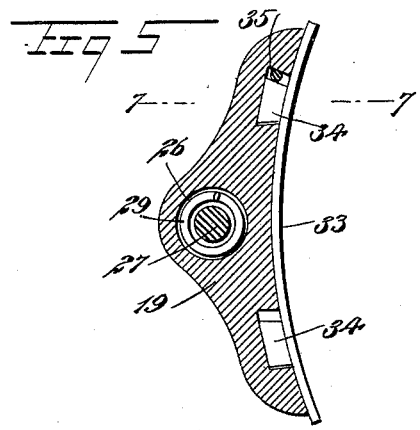
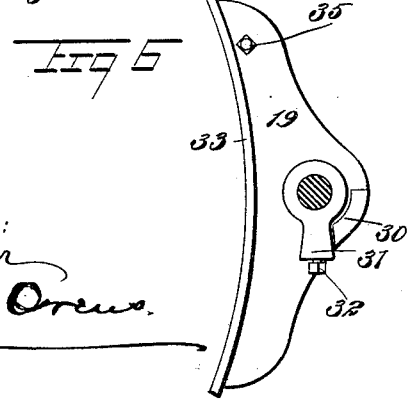
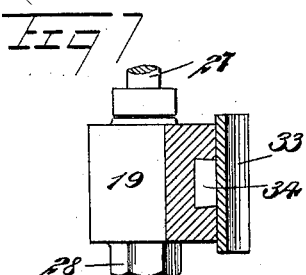
WITNESSES:
H. Walker
Isaac B. Orews
INVENTOR
Charles W. Loomis.
BY
ATTORNEYS.

UNITED STATES PATENT OFFICE.

CHARLES W. LOOMIS, OF OTISVILLE, NEW YORK.

VEHICLE-BRAKE.

SPECIFICATION forming part of Letters Patent No. 649,325, dated May 8, 1900.

Application filed January 18, 1899. Serial No. 702,560. (No model.)

*To all whom it may concern:*

Be it known that I, CHARLES W. LOOMIS, of Otisville, in the county of Orange and State of New York, have invented a new and Improved Vehicle-Brake, of which the following is a full, clear, and exact description.

The purpose of this invention is to provide a vehicle-brake of that class in which the brake may be hung from the body of the vehicle or may be otherwise supported; and the invention embodies certain special combinations by which when the brake is hung on springs it is possible to apply the brake with a force increasing in a ratio with the load on the vehicle, so that when the load is great the brake will be applied with much force and so that when the load is lighter the force of the brake will not be so great.

While in the drawings I show a wagon-body mounted on springs, I do not intend to limit myself to the use of my brake on a vehicle so mounted, for it is adapted for use on any kind of wheeled vehicle.

This specification is the disclosure of one form of my invention, while the claims define the actual scope thereof.

Reference is to be had to the accompanying drawings, forming a part of this specification, in which similar characters of reference indicate corresponding parts in all the views.

Figure 1 is a longitudinal section of the invention on the line 1 1 of Fig. 2. Fig. 2 is a plan of the invention with parts broken away. Fig. 3 is a cross-section on the line 3 3 of Fig. 1. Fig. 4 is a rear elevation of the brake-block with parts broken away. Fig. 5 is a sectional view on the line 5 5 of Fig. 4. Fig. 6 is a side elevation, with parts in section, on the line 6 6 of Fig. 4; and Fig. 7 is a plan view, with parts in section, on the line 7 7 of Fig. 5.

My invention is shown as applied to a vehicle in which the body 10 is mounted on the front axle 11 and the rear axle 12 by means of springs 14, though my brake may also be used on vehicles having no springs. Hanging from the under side of the body 10 and adapted to swing longitudinally with the vehicle are two hanger-arms 15, having bearings 16 at their lower ends, to which bearings are connected the respective radius-bars 17. These bars 17 extend toward the perpendicular plane of the axle upon which run the wheels to which the brake is to be applied and are pivotally fastened at one end to the bearings 16 and at the other end to proper supports, such as the axle, the wagon-frame, or other suitable appliance. While in the drawings I have shown the radius-bars attached to the upper side of the rear axle at 18, it is evident that they may be attached elsewhere, provided their length and the points from which they swing pivotally are such that the arc to which they confine the movement of the brake is such that if continued in the direction of the revolution of the wheel it would cut the circle inscribed by the periphery of the wheel.

The brake-blocks 19 are carried, respectively, on crank-arms 20, forming the extremities of the brake-beam 21, which has its end portions mounted in the bearings 16 and which has its intermediate portion arched upwardly into proximity with the bottom of the body 10 to form essentially a double crank. With this arched or double-cranked portion of the beam 21 is pivotally connected a link 22, which in turn is pivoted to a lever 23, fulcrumed in the bottom of the wagon-body 10 at the point 24 and connected at its free end with a traction-bar 25, through the medium of which the driver may apply pressure to the lever 23 to work the brake. When the brake is to be applied, movement is transmitted to the lever 23 by means of the traction-bar 25 or by any other devices that may be used in place thereof, which movement, causing the lever 23 to be thrown forwardly, projects the link 22 in the same direction and operates to cant forwardly the arched or middle portion of the beam 21, which throws rearward the cranks 20 and forces the brake-blocks against the wheel of the rear axle 12. The brake will thus be applied and with a force or gripping power depending upon the position of the body 10 relative to the axles 11 and 12. Should the body be mounted on springs and be depressed by a great load, the brake-blocks will be engaged very forcibly with the wheels, and owing to the fact that the radius-bars 17 have their rear ends pivoted on the axle 12, while their front ends are connected with the hangers 15, hold the hangers at the proper distance forward of the axle 12. Should the body 10 be depressed from the position shown in Fig. 1, the bearings 16 of the hangers 15 will consequently be lowered, but at the same time the bearings will be drawn rearwardly toward the axle 12 by the action of the radius-bars 17, which, swinging in an arc different from the arc of the rear wheels, will serve to draw the hangers 15, and consequently the brake-blocks, toward the rear wheels. Then when the beam 21 is canted the brake-blocks moving with the cranks 20 will be caused to engage the rear wheels at the beginning of the rearward movement of the cranks 20, so that as the cranks 20 continue to move rearwardly they will still further press the brake-blocks into action, thus enabling great force to be applied by the brake-blocks. In Fig. 1 I have shown by dotted lines the arc in which the brake-blocks move and the radius of said arc. This illustrates the intersection of said arc with the arc of the rear wheels, and consequently the action of the brake. The brake-blocks are located below the center of the wheels upon which the brake is applied, and consequently bear against the under halves of the wheels. This arrangement serves to steady the body and to insure a uniform application of the brakes, notwithstanding that the body 10 may be jolted by the movement of the vehicle, all of which is true, seeing that when the brake-blocks are once against the rear wheels the brake-blocks in moving up with the body 10 will move toward and impinge against the rear wheels, as contradistinguished from moving away from the same, as would be the case were the brake-blocks engaged with the wheels at points above the planes of the axles 11 and 12.

The brake-blocks 19 are formed with cavities 26 therein, which loosely receive spindles 27, formed on the cranks 20. These spindles carry nuts 28, fast to the spindles, and each engaged by one end of a transverse spiral spring 29, the other ends of the springs being respectively engaged with the brake-blocks and the springs having such adjustment as will throw the brake-blocks forward at their upper ends. (See Fig. 1.) This serves to hold the brake-blocks steadily in the position shown in Fig. 1 when the brake-blocks are not engaged with the wheels. The spindle 27 is drilled through from side to side, and the nut 28 is drilled through at each of its sides, and the nut is keyed to the spindle by passing a spring-cotter 28ª through the nut and spindle. When it is desired to increase the tension of the spring 29, the nut 28 is turned on the spindle and the spring-cotter 28ª is then passed through alining apertures in the spindle and nut. The movements of the brake-blocks under the influence of the springs 29 are limited by means of studs 30, formed on the brake-blocks and coacting with shouldered collars 31, adjustably attached to the spindles 27 by means of set-screws 32. The brake-shoes 33 are fastened to the blocks 19 by means of dovetail lugs 34, fitting into corresponding cavities in the brake-blocks and held from removal by means of a bolt 35, that passes transversely through the upper portion of the brake-block. By these means the brake-shoe is removably held in place.

Having thus described my invention, I claim as new and desire to secure by Letters Patent—

1. In a vehicle-brake, the combination of a pivoted radius-bar, a mounted hanger having at its lower end a bearing connected with the radius-bar, a cranked brake-beam mounted to turn in the bearing, means operatively connected with the brake-beam and adapted to rock the latter, and a brake-block attached to said cranked brake-beam, substantially as described and illustrated.

2. In a vehicle-brake having a depending hanger, a brake-beam operatively connected with the hanger, means for rocking the beam, and a brake-block carried by the beam, the combination of a radius-bar operatively connected at one end with the hanger and pivotally connected at the other end with a fixed support, substantially as described and illustrated.

3. In a vehicle-brake, the combination with the vehicle-body and the wheel-axles on which the body is sustained, of a swinging hanger depending from the body, a radius-bar pivotally connected with the hanger and with one of the axles at a point above the center of the wheels thereof, a cranked beam mounted in the hanger, means for rocking the beam, and a brake-block carried by the beam.

4. In a vehicle-brake, the combination of a swinging hanger sustained by the vehicle and projecting below the plane of the axles thereof, a radius-bar in connection at one end with the hanger and at the other pivotally attached to a fixed support, a beam mounted in the bearing, a brake-block carried by the beam and located at a point below the plane of the axles, and means for actuating the brake-beam to apply the brake.

5. In a vehicle-brake, the combination of a swinging hanger depending from the body of a vehicle and extending to a point below the plane of the axle thereof, a radius-bar in a pivotal connection with the hanger and with one of the axles, a brake-block located below the plane of the axles, and means for carrying and applying the brake-block.

6. In a vehicle-brake, the combination with the vehicle-body and the wheeled axles on which the body is sustained, of swinging hangers carried by the body and extending to a point below the plane of the axles, radius-bars respectively pivoted to the hangers and to one of the axles at a point above the center of the wheels thereof, a cranked brake-beam mounted in the hangers, means for rocking the brake-beam, and brake-blocks carried by the beam at points below the hangers.

7. The combination of a spindle, a brake-block mounted loosely on the spindle, a spring serving to throw the brake-block in one direction, a shouldered collar loosely encircling the spindle and adapted to be engaged by a part of the brake-block to limit the movement of the brake-block, and means for adjustably holding the shouldered collar on the spindle.

8. The combination of a brake-block having a cavity therein, a brake-shoe having a dovetail projection fitted in the cavity, and a transversely-extending bar engaging the dovetail projection to hold the brake-shoe removably on the brake-block.

CHARLES W. LOOMIS.

Witnesses:
ALSOP W. DODGE,
JOEL NORTHRUP.